Patented Apr. 27, 1943

2,317,436

UNITED STATES PATENT OFFICE 2,317,436

COLOR-COATING CELLULOSIC MATERIALS

Ernest R. Boller, Twinsburg Township, Summit County, and Howard E. Hanthorn, Cuyahoga Falls, Ohio, and Robert H. Treadway, Decatur, Ill., assignors to E. I. du Pont de Nemours & Company, Wilmington, Del., a corporation of Delaware No Drawing. Application October 18, 1940, Serial No. 361,718

9 Claims. (Cl. 117—152)

This invention relates to processes and compositions for coating cellulosic materials and to the coated products produced. More particularly, the invention is directed to paper coating compositions in which not less than about one-half per cent of a dye is dispersed in a color base comprising an alkali silicate solution having an $SiO_2$:alkali oxide mol ratio of about from 3 to 4 and a specific gravity of about from 15 to 35° Bé., the ratio and gravity being so related that the product of their multiplication does not exceed about 120, and the color base preferably also containing about from 2 to 5 per cent of gum ghatti. The invention is further directed to coating processes in which these coating compositions are applied to cellulosic materials in such a manner that they form a film on the surface of the material, and preferably thereafter coating this film with a film of aluminum acetate solution, and is still further directed to the coated cellulosic products thus produced.

When materials such as paper having hydrophilic surfaces are coated with dye solutions an undesirable degree of penetration of the dye into the paper occurs. This penetration is undesirable because the part of the dye below the surface of the paper serves no useful purpose and hence increases the total dye requirement and consequently the cost of producing any particlar degree of surface coloring. The appearance of such dye coatings is also less attractive than is desired.

It has been the practice to retard such penetration by applying dyes as dispersions in suitable vehicles such as lacquers or solutions of gum, casein or zein. Such methods accomplish the desired results of retaining the color at the surface of the material being coated and thus reduce the amount of dye required and the cost of the operation and at the same time impart a desirable glossy appearance to the coated surface. However, the cost of the lacquer, gum, casein or other vehicle ingredients offsets to a considerable extent the saving occasioned by the decrease in dye consumption.

Unfortunately, the coatings produced by many of the substances used as vehicles for dyes give rise to new difficulties connected with the use to which the coated surfaces are put. For instance, it may be desired to print upon the coated surfaces, and it is found that many of the coatings heretofore available are not receptive to printing inks. Similarly, it may be desired to employ corrugated board having coated surfaces in the manufacture of boxes, and it is frequently found that the surface coating interferes with the sticking ability of the adhesives used to seal the boxes. Such difficulties, together with the cost of the vehicle, have tended to retard the commercial adaptation of processes for surface coating cellulosic materials such as paper with dyes.

Now we have found that fibrous cellulosic materials may advantageously be coated with compositions comprising not less than about one-half per cent of a dye dispersed in a color base comprising an alkali silicate solution having an $SiO_2$:alkali oxide mol ratio of about from 3 to 4 and a specific gravity of about from 15 to 35° Bé., the ratio and gravity being so related that the product of their multiplication does not exceed about 120, and the color base preferably also containing about from 2 to 5 per cent of gum ghatti. We have found that such coating compositions may be applied to cellulosic materials by face-coating methods to give coated products in which the dye is present in the silicate surface coating, and diffusion of the dye below the surface of the cellulosic material is substantially avoided.

Cellulosic materials surface-coated with the dye-containing silicate coating compositions of our invention present a pleasing appearance and articles such as corrugated or solid fiberboard boxes made of the coated material possess an uncommon attractiveness to users. The silicate imparts to the surface a glossy or semi-glossy finish having a rich lustre and the dye imparts color appeal which is augmented by proper adaptation of the color to the psychological effects desired.

The silicate-dye compositions of our invention provide a relatively inexpensive coating for paper in keeping with other items of cost of the paper product. This relatively low cost is due in part to the fact that the dye used is retained in the surface coating with a minimum of loss due to diffusion into the underlying material, as has already been pointed out. It is also in part due to the inherently lower cost of soluble alkali silicates as compared with such coatings as casein heretofore used.

The silicate-dye coatings of our invention are further advantageous in that they are well suited to receive and hold upon their surfaces such further coatings as printing and adhesives. Thus boxes made from corrugated or fiberboard coated with silicate-dye composition may readily be sealed with adhesives in common use for this purpose and may have printed upon their surfaces labels, instructions, trade-marks, and such other matter as is commonly printed upon boxes.

The nature of our novel silicate-dye coating compositions and processes for using them and of our novel surface-coated materials thus produced will be better understood by reference to the following illustrative examples, although the examples are not to be construed as limiting, as the products and processes described are susceptible of wide variation and modification.

Example I shows the preparation and application of a composition of our invention to the coating of paper.

*Example I*

A silicate-dye coating composition was made by dissolving one part by weight of the dye, Orange G, in 18 parts by weight of water and adding this solution to 81 parts of a 42.5° Bé. 3.36 $SiO_2$–$Na_2O$ mol ratio sodium silicate solution. The resulting solution of the dye in the sodium silicate had a specific gravity of 35° Bé. This solution was applied as a surface coating to kraft paper by means of a doctor roll at the rate of from two to five pounds of coating solution per thousand square feet. The coated surface of the paper had a semi-glossy appearance and was a bright orange color. The coated paper was flexible and showed little tendency to scuffing when subjected to abrasion.

It will be observed that the silicate solution used as a color base in Example I had an $SiO_2$:$Na_2O$ mol ratio (3.36) and a specific gravity (35° Bé.) which were so related that the product of their multiplication was 118. It is seen, therefore, that a silicate having a substantially higher mol ratio could not have been used unless a lower gravity solution had been employed, and conversely, a substantially higher specific gravity could not have been employed unless a lower ratio had been used, since otherwise the product of the gravity multiplied by the ratio would have exceeded about 120. When this multiplication product is permitted to exceed 120, the coating composition posseses undesirable working characteristics, has a tendency to gel, and in other respects presents vexatious difficulties. On the other hand, it is desirable to maintain both the ratio and the specific gravity at a relatively high value within the limits specified, since optimum working characteristics may thereby be attained.

In order to widen the range of compositions which may be employed as coating solutions for cellulosic materials in accordance with our invention, we have found it advantageous to include in the color base from about 2 to 5 per cent of gum ghatti. The gum ghatti imparts improved body to low gravity or low ratio silicate-dye coating compositions of our invention and also contributes to improved depth of color and lustre of the coating. The preparation of such a coating composition is shown in Example II.

*Example II*

A solution comprising 1.1 parts by weight of glacial acetic acid and 22.2 parts of water was made up and in this solution there was dispersed with agitation 4.3 parts of gum ghatti. This solution was then added to 72.4 parts by weight of a sodium silicate solution having a specific gravity of 42.5° Bé. and an $SiO_2$:$Na_2O$ mol ratio of 3.36, the mixture being effected at a temperature of 150° F. with rapid agitation. The resulting color base was about 33° Bé. To 76 parts by weight of this color base there was then added a solution comprising 2 parts by weight of the yellow dye, Tartrazine O, dissolved in 22 parts by weight of water. The resulting product had a specific gravity of 25° Bé. measured at 78° F. and an $SiO_2$:$Na_2O$ mol ratio of 3.7 and was a deep yellow color.

The solution thus prepared was applied by a face coating method to kraft paper. A surface coating having a bright yellow color was thus obtained.

Compositions similar to those of Example I were prepared using the dyes enumerated below, and then the silicate-dye solutions were used for coating paper to give coated products of excellent color and surface characteristics.

Methylene Blue ZX
Tartrazine O
Naphthol Green B Concentrated
Pontacyl Green NV Concentrated
Pontamine Black E
Fiber Black N
Paper Yellow L Concentrated
Rhodamine B
Pontacyl Brilliant Blue E
Pontacyl Light Yellow 3G
Anthraquinone Blue 3G In place of the sodium silicat of Examples I and II, there may be substituted in our novel coating compositions other alkali silicates. Examples III shows the use of potassium silicate for this purpose.

*Example III*

In 32.5 parts by weight of water there was dissolved one part of Rhodamine B dye. This solution was then added with rapid stirring to 66.5 parts of potassium silicate solution having a specific gravity of 29.8° Bé. and an $SiO_2$–$K_2O$ mol ration of 3.92. The resultant dye solution had a specific gravity of 20° Bé.

This solution was applied by means of a transfer roll to jute paper at the rate of two to five pounds per thousand square feet. The coated paper had a semi-glossy surface and a deep cerise red color.

In preparing the alkali silicate-dye compositions of our invention, the $SiO_2$:alkali oxide mol ratio of the alkali silicate should be from about 3 to about 4, and preferably from about 3.50 to about 4. With ratios less than 3, the color intensity of the dye is adversely affected and the solubility of many dyes is reduced to an extent sufficient to make them inadequate as coloring agents. For instance, tartrazine O dye gives a dull solution in sodium silicate having an $SiO_2$:$Na_2O$ mol ratio below 3, but a bright yellow in silicate having 3.52 ratio. As an example of the reduced solubility at lower ratios, Rhodamine B dye precipitates when its aqueous solution is added to a sodium silicate solution with a ratio below 3, but is quite stable in a 3.52 ratio silicate. In order to offset some of these observed effects of lower ratio silicates, it is sometimes desirable to neutralize a part of the alkali, as with acetic acid, and thereby in effect produce a higher ratio in the silicate, as shown in Example II above.

The specific gravity of the silicate-dye solution should be from about 15 to 35° Bé. We have found that more dilute solutions than 15° Bé. penetrate too readily into the paper, causing undue stiffness of the paper and reducing the covering power of the dye used. On the other hand, solutions with a specific gravity higher than about 35° Bé. have too high a concentration to permit sufficient solubility of dyes. The preferred gravity depends to some extent on the SiO2:alkali oxide ratio, the use of lower specific gravities being desirable for higher ratio silicates. With a 3.52 to 4.00 ratio sodium silicate, for example, a 20° to 25° Bé. gravity is to be preferred.

The proportion of dye in the coating solution should be at least one-half per cent by weight of the total solution. Ordinarily it is preferred that the dye constitute from about 1 to about 2 per cent of the total weight, although if very high tinctorial power is desired, even more than 2 per cent may be used. With less than one-half per cent dye the tinctorial power of the dye is ordinarily insufficient to effect a satisfactory degree of hiding or covering of the underlying surface.

To obtain various color effects such as pastel shades, it may in some instances be desirable to mix with the silicate-dye solution a pigment or other similar coloring material. Example IV illustrates the use of the pigment, titanium dioxide, to obtain a pastel shade.

*Example IV*

A dispersion containing 4.8 parts of titanium dioxide, 0.5 part of gum tragacanth, and 1 part of Rhodamine B dye in 39.4 parts of water was made up and added to 54.4 parts of a 34° Bé. 3.7 SiO2:Na2O mol ratio sodium silicate solution with rapid agitation.

The composition thus prepared was applied as a coating to chip paper by means of a transfer roll at the rate of five pounds per thousand square feet. The paper so coated had a pleasing pastel pink color and a semi-gloss finish.

There may be used in conjunction with our novel silicate-dye coating compositions a variety of modifying agents. Wetting agents may be added to improve the spread and levelness of penetration, particularly over a highly sized paper surface. Starch and alum may be used to aid in color fixation. Diatomaceous earths, clays, and pigments such as the titanium oxide of Example III may be used in combination with dyes to produce pastel colors.

Where a material coated with a silicate-dye solution in accordance with our invention is to be subjected to direct contact with water or extremely high humidity, we have found it advantageous to apply over the surface of the silicate coating a coating of aluminum acetate. Example V illustrates the application of such a coating.

*Example V*

In 41.2 parts by weight of water there was dissolved 2 parts of Methylene Blue ZX dye, and this solution was then stirred rapidly into 56.8 parts of a 34° Bé. 3.36 SiO2:Na2O mol ratio sodium silicate. A kraft paper was coated with four pounds per thousand square feet of this solution by means of a transfer roll. There was then applied to the surface of the silicate coating a 32 per cent aqueous solution of monobasic aluminum acetate at the rate of one and five-tenths pounds per thousand square feet of surface. The coated product thus obtained had a clear purple colored surface which was repellent to water. Besides imparting water repellency, the aluminum acetate coating added gloss to the silicate-coated paper and accentuated the color of the dye.

In place of the aluminum acetate solutions already described as after-coatings for silicate-dye coated surfaces, there may be used solutions of other fatty acid salts of aluminum, such as, for instance, aluminum formate.

There may also be used in conjunction with the above-described aluminum fatty acid salts addition agents such as oils, waxes, and fatty substances, to enhance further the water resistance of the silicate-dye coatings. Soluble oils such as mineral or vegetable oils containing as an emulsifier a sulfonated oil; wax emulsions, rosin emulsified with sulfonated oils, wax emulsions of the "non-rub" floor wax type, aluminum stearate, oleate, or palmitate, and aluminum resinate dispersions, paraffin wax emulsions, aluminum salts of acids found in natural waxes, suitably may be used.

The silicate-dye coating compositions of our invention are applied to cellulosic materials in such a manner that they form a film on the surface of the material. The transfer roll shown in the foregoing examples is a preferred method because it insures a uniform, even coating of controllable thickness. In place of the transfer roll, there may be employed such methods as mechanical or manual brushing, or spraying.

By the application of a silicate-dye coating composition to a cellulosic material in accordance with our invention there is imparted to the cellulosic material a surface of pleasing appearance and possessing such other desirable properties as flexibility, grease resistance, and scuff resistance. Since the coating is primarily a surface coating, the dye used is present at or near the surface of the coated material, and hence the amount of dye required to give any desired intensity of color is held to a minimum. It may be readily appreciated, therefore, that such cellulosic materials as paper, cardboard, solid fiberboard and cotton cloth, and other kinds of paper in addition to the kraft, chip, and jute papers shown in the examples may be given a pleasing, attractive and useful finish.

While we have shown certain specific silicate-dye compositions and certain specific coated cellulosic materials and processes for producing them, it will be understood that one skilled in the art may readily employ numerous processes and related compositions and may produce related coated materials without departing from the spirit of this invention.

We claim:

1. A surface coating agent for cellulosic materials comprising at least one-half per cent of a dye dispersed in a color base comprising an alkali silicate solution having an SiO2: alkali oxide mol ratio of about from 3 to 4 and a specific gravity of about from 15 to 35° Bé., the ratio and gravity being so related that the product of their multiplication is in the range from 45 to 120.

2. A surface coating agent for cellulosic materials comprising from one-half to two per cent of a dye dispersed in a color base comprising from about two to five per cent of gum ghatti dispersed in an alkali silicate solution having an SiO2: alkali oxide mol ratio of from about 3 to 4 and a specific gravity of from about 15 to 35" Bé., the ratio and gravity being so related that the product of their multiplication is in the range from 45 to 120.

3. A coated cellulosic product comprising a cellulosic underlying material having upon its surface a film of a silicate-dye composition in which at least one-half per cent of a dye is dispersed in an alkali silicate having an SiO2: alkali oxide mol ratio of from about 3 to about 4.

4. A coated cellulosic product comprising a cellulosic underlying material having upon its surface a film of a silicate-dye composition characteristic of that producible from a solution containing from one-half to two per cent of a dye is dispersed in an alkali silicate having an $SiO_2$: alkali oxide mol ratio of from about 3 to about 4 and in which is additionally dispersed a minor portion of gum ghatti.

5. A coated cellulosic product comprising a cellulosic underlying material having upon its surface a film characteristic of that producible from a silicate-dye composition in which from one half to two per cent of a dye is dispersed in an aqueous alkali silicate solution having an $SiO_2$: alkali oxide mole ratio of from about three to about four and in which is additionally dispersed a minor amount of gum ghatti, and having upon the surface of said silicate-dye film a coating of aluminum acetate.

6. In a process for coloring cellulosic materials the step comprising applying to the surface of a cellulosic material a film of an aqueous alkali silicate-dye solution.

7. In a proces for coloring cellulosic materials the steps comprising forming a coating of an aqueous alkali silicate-dye solution upon a transfer roll and effecting contact between this coating and a cellulosic material, whereby a film of the silicate-dye solution is formed substantially on the surface of the cellulosic material and imparts to the product a characteristic color.

8. In a process for coloring cellulosic materials the steps comprising forming upon a transfer roll, a coating of a silicate-dye composition comprising from about one-half to two per cent of a dye dispersed in a color base comprising an alkali silicate solution having an $SiO_2$: alkali oxide mol ratio of about from 3 to 4 and a specific gravity of about from 15 to 35° Bé. and the ratio and gravity being so related that the product of their multiplication is in the range from 45 to 120, and effecting contact between this coating and a cellulosic material, whereby a film of the silicate-dye solution is formed substantially on the surface of the cellulosic material and imparts to the product a characteristic color.

9. In a process for coloring cellulosic materials the steps comprising applying to the surface of a cellulosic material a film of an aqueous alkali silicate-dye solution and applying on the surface of this film, a film of a fatty acid salt of aluminum selected from the group consisting of aluminum acetate and aluminum formate.

ERNEST R. BOLLER.
HOWARD E. HANTHORN.
ROBERT H. TREADWAY.